United States Patent [19]

Revis

[11] Patent Number: 5,922,449
[45] Date of Patent: Jul. 13, 1999

[54] SELECTIVE BONDED PHASE MATERIALS FOR HPLC SEPARATIONS AND METHOD FOR MAKING THE SAME

[75] Inventor: Anthony Revis, Freeland, Mich.

[73] Assignee: Diazem Corporation, Midland, Mich.

[21] Appl. No.: 08/964,663

[22] Filed: Nov. 5, 1997

[51] Int. Cl.⁶ .................................................. B01J 20/22
[52] U.S. Cl. .................................... 428/306.6; 428/307.3; 428/405; 428/447; 428/448; 502/401; 502/405; 502/407
[58] Field of Search .............................. 428/306.6, 307.3, 428/405, 447, 448; 502/401, 405, 407

[56] References Cited

U.S. PATENT DOCUMENTS

| | | | |
|---|---|---|---|
| 4,773,994 | 9/1988 | Williams | 210/198.2 |
| 4,778,600 | 10/1988 | Williams | 210/198.2 |
| 4,782,040 | 11/1988 | Revis et al. | 502/401 |
| 4,855,054 | 8/1989 | Williams | 210/635 |
| 4,897,197 | 1/1990 | Williams | 210/635 |
| 4,941,974 | 7/1990 | Williams | 210/198.2 |
| 4,950,634 | 8/1990 | Williams et al. | 502/401 |
| 4,950,635 | 8/1990 | Williams et al. | 502/401 |
| 4,959,340 | 9/1990 | Williams | 502/401 |
| 5,110,784 | 5/1992 | Williams et al. | 502/401 |
| 5,512,169 | 4/1996 | Williams | 210/198.2 |
| 5,545,317 | 8/1996 | Williams | 210/198.2 |
| 5,559,039 | 9/1996 | Williams | 436/161 |

*Primary Examiner*—D. S. Nakarani
*Attorney, Agent, or Firm*—Killworth, Gottman, Hagan & Schaeff, L.L.P.

[57] ABSTRACT

A bonded phase material useful with a chromatographic separation process. The bonded phase material includes a hydroxyl bearing porous material, a first controlled stoichiometric amount of a first interactive silane covalently bonded to the surface of the hydroxyl bearing porous material and at least one additional interactive silane covalently bonded to the surface of the hydroxyl bearing porous material to provide the porous material with a gradient of functionality of varied polarity creates a unique overall polarity which is not obtainable by the separate interactive silanes themselves. The method of silating the porous material includes sequential application of controlled stoichiometric amounts of the interactive silanes.

12 Claims, No Drawings

SELECTIVE BONDED PHASE MATERIALS FOR HPLC SEPARATIONS AND METHOD FOR MAKING THE SAME

BACKGROUND OF THE INVENTION

In high pressure liquid chromatography, components of a mixture or solution are separated based upon the rates at which they are carried by a liquid mobile phase through a column containing a stationary or bonded phase which is bonded to a support material. The support material is usually porous and usually has its inner and outer surfaces covered with hydroxyl molecules. These hydroxyl molecules are displaced when an organic material bonds to the surface of the porous support material, either physically or chemically, to form the bonded phase. Typically, the porous support material has a surface area which allows about 2.5 molecules of organic material to be placed on each square nanometer of porous support material surface. The order at which various components of a solution elute from the chromatographic column is determined by the nature of the organic material bonded to the surface of the porous support material. The relative concentrations of the components of the solution are determined by calculating the area under peaks printed on a chromatogram.

Currently in the art, the organic material is bonded to the surface of the porous support material by either saturation coverage or starved coverage. With saturation coverage, the organic material is provided in an amount much greater than 2.5 molecules/nm$^2$ so that the porous support material is swamped with the organic material and as much as possible of the surface area of the porous support material is covered with the organic material. Because unreacted hydroxyls on the surface of the porous support material affect time of elution molecules in the solution and cause broadening of the resultant chromatographic peaks, any unreacted hydroxyls on the surface of the support material are then reacted with a second organic material. Such a process is referred to as "end-capping." Typically, the organic material is added in a concentration sufficient to cap off residual hydroxyl groups which are not bonded with the first organic material. This second, end-capping material plays no part in the order of elution of the components of the solution from the column and is provided solely to prevent unreacted hydroxyls on the surface of the porous support material from extending the elution time or broadening the resultant peaks. Usually, but not always, end-capping agents are $C_1$ silanes.

With starved coverage, an organic material is reacted with the porous support material in an amount much less than necessary to react with all of the hydroxyls available on the entire surface of the porous support material. The remaining hydroxyls on the surface of the support are end-capped with a second organic material which plays no part in the chromatographic separation. When a starved coverage of the porous support material is used, the elution time of the chromatograph is typically faster than the elution time of a chromatograph employing a saturated coverage because there are fewer molecules on the surface of the support with which the components of the solution can interact.

In U.S. Pat. No. 5,110,784, a novel method is described for providing a porous support material for chromatographic separations. The method includes reacting a stable but rapidly reacting silane with the hydroxyls on the exterior surface of the porous support material, and then reacting a second reactive silane with the hydroxyls on the porous interior surface of the porous support material to provide a dual surface material in which the silicon-containing groups attached to exterior surface of the porous support material are different than the silicon-containing groups on the surface of the porous interior of the material.

However, these prior art materials still experience problems with interference. Interference occurs when the chromatographic peak on a chromatogram for one component of a solution overlaps at least one peak for another component of the solution. Interference results when the chromatographic column is unable to completely resolve, i.e. separate, those two or more components to produce separate peaks. When resolution problems occur, it is common in the art either to increase or decrease the elution time in an attempt to move interfering peaks to a position at which they do not interfere with each other. However, with conventional chromatographic columns and packing materials, increasing or decreasing the elution time does not always remove interfering peaks and, in the case of increasing the elution time, the time required to run the chromatogram greatly increases.

Currently, a need exists in the art for a bonded phase material for a chromatographic separation process which can be used to selectively elute materials in a high pressure liquid chromatographic column so that interference problems can be reduced, if not eliminated entirely.

SUMMARY OF THE INVENTION

The present invention solves the currently existing need in the art for a bonded phase material which can be used to selectively elute the components of a solution to reduce interference problems. The present invention also provides a method for silylating a porous support material to provide for selective elution of the components of a solution.

The present invention provides for a unique bonded phase material which is useful with a chromatographic separation process to provide a unique selectivity. The bonded phase material includes a hydroxyl bearing porous material which has a surface; a first controlled stoichiometric amount of a first interactive silane covalently bonded to a first portion of the surface of the hydroxyl bearing porous material; and at least one additional controlled stoichiometric amount of at least one additional interactive silane covalently bonded to a portion of the surface of the hydroxyl bearing porous material not occupied by the first silane. The first interactive silane has a first organic functionality. The at least one additional silane has an other organic functionality which is distinct from the first organic functionality. Together, the first interactive silane and the at least one additional interactive silane provide the porous material with a gradient of functionality of varied polarity. By providing a porous support material with various gradients of functionality, the chromatographic column can be used to selectively elute various components of a solution.

The present invention provides a method for silylating a porous material. The method includes contacting a hydroxyl-bearing porous material with a controlled stoichiometric amount of a first interactive silane having a first organic functionality. The first silane is then allowed to react and form covalent bonds with a portion of a surface of the porous material by reacting with a portion of the hydroxyl groups. Next, the hydroxyl-bearing porous material is contacted with a controlled stoichiometric amount of at least one additional interactive silane having an other organic functionality. This other organic functionality is distinct from the first organic functionality and any other organic functionalities which have been added to the surface of the porous support material. This additional interactive silane is then allowed to react and form covalent bonds with a portion of the surface of the porous material not covered by the first silane by reacting with a portion of the hydroxyl groups not reacted with the first silane.

In one aspect of the present invention, the at least one additional interactive silane includes a second interactive silane having a second organic functionality. The second organic functionality is distinct from the first organic functionality.

In another aspect of the present invention, the at least one additional interactive silane includes a second interactive silane having a second organic functionality and a third interactive silane having a third organic functionality. In this aspect of the invention, the first organic functionality, the second organic functionality and the third organic functionality are distinct from each other.

In still another aspect of the present invention, the at least one additional interactive silane includes a second interactive silane having a second organic functionality, a third interactive silane having a third organic functionality and a fourth interactive silane having a fourth organic functionality. In this aspect of the invention, the first organic functionality, the second organic functionality, the third organic functionality and the fourth organic functionality are distinct from each other.

In a further aspect of the present invention, the at least one additional interactive silane includes a second interactive silane having a second organic functionality, a third interactive silane having a third organic functionality, a fourth interactive silane having a fourth organic functionality, and a fifth interactive silane having a fifth organic functionality. In this aspect of the invention, the first organic functionality, the second organic functionality, the third organic functionality, the fourth organic functionality and the fifth organic functionality are distinct from each other.

The present invention offers a commercial advantage to the HPLC industry in which a need exists for porous support materials with different retention characteristics. The instant invention can be used to change the order in which the components of a solution are eluted from a chromatographic column. This results in better detection and quantitation and allows for elution patterns which do not have overlapping or interfering peaks. These and other advantages of the invention will become apparent from the following detailed description and the appended claims.

DETAILED DESCRIPTION OF THE INVENTION

It has been discovered that when controlled stoichiometric amounts of two or more interactive silanes having chemically different organic functionalities are permanently bonded to the surface of a hydroxyl bearing porous material, such as a silica support, the retention characteristics of the porous support material can be selectively changed for analyzed organic species to alter the order in which the analyzed organic species are eluted from the HPLC column. The elution characteristics of the porous support material of the present invention differ from conventional porous support materials which include interactive silanes composed of chemically similar organic functionalities permanently bonded to a silica support. Further, the addition of these interactive silanes to the silica support does not increase the elution time.

As used herein, an "interactive silane" is a silane which reacts with the hydroxyls on the surface of a hydroxyl bearing porous material and thereafter participates in the chromatographic separation process. The interactive silane is not added to the surface of the porous material solely for the purpose of endcapping any unreacted silanes on the surface of the porous material.

The porous support materials of the present invention are prepared using a controlled reaction of organosilanes of different polarity to not only change the band spacing of a given sample but also to completely change the order of elution. As used herein, "controlled" means that a less than stoichiometric amount of an organosilane is added to the silica support such that, when all organosilanes are added to the surface of the porous support material, the new bonded phase composition comprises a gradient of functionality of varied polarity. The combination creates a unique overall polarity on the stationary phase and consequently a unique selectivity, which is not obtainable independently by the separate organosilanes themselves.

The net effect of the present invention is that the surface of the porous material is provided with areas having differing polarities. These areas of differing polarity provide the porous material with a unique overall polarity which, in turn, provides the porous material with a unique selectivity that is not obtained independently by the interactive silanes by themselves.

The porous material can be contacted with controlled stoichiometric amounts of subsequent interactive silanes to further alter the overall polarity of the porous material. The only requirement is that these subsequently added interactive silanes have organic functionalities that differ from the functionalities of the interactive silanes previously added to the surface of the porous material. The only limiting factor in regard to the number of additional silanes which can be added to the surface of the porous material is the amount of silanes which the surface of the porous material can accommodate.

Most silanes are useful with this invention. Desirably, the interactive silanes useful with this invention include, but are not limited to, the following:

(i) disubstituted amides wherein the amides are selected from the group consisting of
(a) N,N-disubstituted amides having the general formula

and
(b) N,O-disubstituted amides having the general formula formula

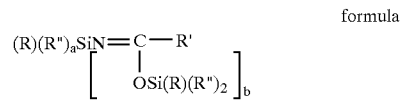

wherein in the formulae, R is selected from hydrogen, allyl, vinyl, methyl ether, ethyl ether, propyl ether, methyl ester, ethyl ester, propyl ester, methyl ketone, ethyl ketone, and propyl ketone and Q wherein Q is selected from a group consisting of
(a) alkyl groups having less than thirty-five carbon atoms,
(b) aryl groups having less than thirty five carbon atoms
(c) —$(CH_2)_x(CF_2)_yCF_3$, (d) —$(CH_2)_xCl$,
(e) —$(CH_2)_xSR^{iv}$,
(f) —$(CH_2)_xNR_2^{iv}$,
(g) —$(CH_2)_xN(R^{iv})(CH_2)_xN(R^{iv})_2$, (h) 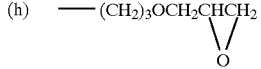

(i) 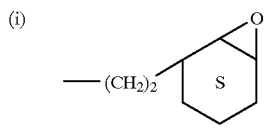

(j) —$(CH_2)_3OC(O)C(CH_3)=CH_2$ (k) 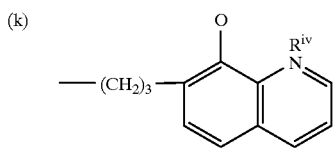

(l) 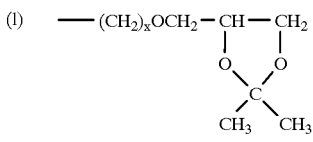

(m) —$(CH_2)_xO(CH_2)_xOR$
(n) —$(CH_2)_xNR_3^{iv}Z$ and
(o) —$(CH_2)_xNRC(O)OR^{iv}$ wherein R" is independently selected from methyl, ethyl and phenyl groups; R" is selected from methyl, ethyl and phenyl groups; R' is a substituted or unsubstituted alkyl group of from 1 to 6 carbon atoms or hydrogen; $R^{iv}$ is selected from hydrogen, methyl, ethyl, propyl and phenyl groups; a+b has a value of 3 and neither a nor b has a value of zero; x=1–15; y=0–15; Z is a halogen or other negatively charged species;

(ii) substituted amines wherein the amines are selected from a group consisting of
(a) N,N,N-trisubstituted amines having the general formula $(R^v)(R^{vi})_cSi(NR^{vii}_2)_d$ and
(b) heterocyclic amines, wherein the heterocyclic amines are selected from the group consisting of

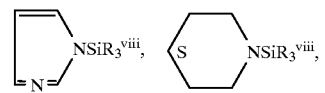

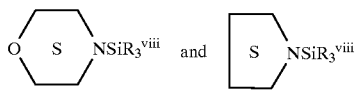

wherein in the formulae $R^v$ and $R^{viii}$ are each independently selected from a group consisting of hydrogen, allyl, vinyl and Q' wherein Q' is selected from a group consisting of
(a) alkyl groups having less than thirty-five carbon atoms,
(b) aryl groups having less than thirty five carbon atoms, (c) —$(CH_2)_x(CF_2)_yCF_3$,
(d) —$(CH_2)_xCl$
(e) —$(CH_2)_xSR^{iv}$,
(f) —$(CH_2)_xNR_2^{iv}$,
(g) —$(CH_2)_xN(R^{iv})(CH_2)_xN(R^{iv})_2$, (h) 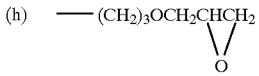

(i) 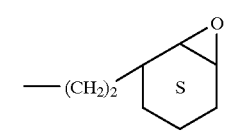

(j) —$(CH_2)_3OC(O)C(CH_3)=CH_2$ (k) 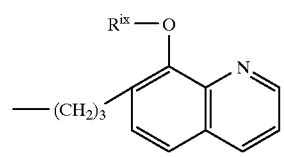

(l) 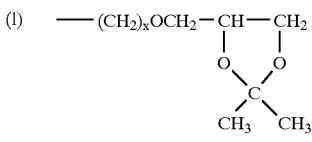

(m) —$(CH_2)_xO(CH_2)_xOR$
(n) —$(CH_2)_xNR_3^{iv}Z$
(o) —$(CH_2)_xNRC(O)OR^{iv}$ wherein R" is independently selected from methyl, ethyl and phenyl groups; R" is selected from methyl, ethyl and phenyl groups; R' is a substituted or unsubstituted alkyl group of from 1 to 6 carbon atoms or hydrogen; $R^{iv}$ is selected from hydrogen, methyl, ethyl, propyl and phenyl groups; a+b has a value of 3 and neither a nor b has a value of zero; x=1–15; y=0–15; Z is a halogen or other negatively charged species;

(iii) thioethers selected from the group consisting of (a) thioethers having the general formula $R^xR_2^{xi}Si(SR^{xii})_dS$ and (b) thioethers having the general formula $(R^xR_2^{xi}Si)_2S$ wherein in the formulae, $R^x$ is selected from a group consisting of hydrogen, allyl, vinyl and Q" wherein Q" is selected from a group consisting of
(a) alkyl groups having less than thirty-five carbon atoms,
(b) aryl groups having less than thirty five carbon atoms
(c) —$(CH_2)_x(CF_2)_yCF_3$,
(d) —$(CH_2)_xCl$,
(e) —$(CH_2)_xSR^{iv}$,
(f) —$(CH_2)_xNR_2^{iv}$,
(g) —$(CH_2)_xN(R^{iv})(CH_2)_xN(R^{iv})_2$, (h) 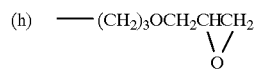

-continued (i) 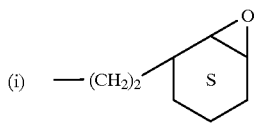

(j) —(CH$_2$)$_3$OC(O)C(CH$_3$)=CH$_2$ (k) 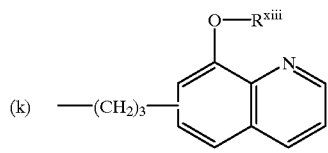

(l) 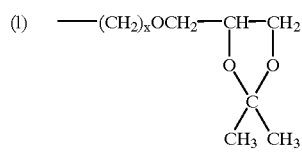

(m) —(CH$_2$)$_x$O(CH$_2$)$_x$OR
(n) —(CH$_2$)$_x$NR$_3^{iv}$Z and
(o) —(CH$_2$)$_x$NRC(O)OR$^{iv}$ wherein R" is independently selected from methyl, ethyl and phenyl groups; R" is selected from methyl, ethyl and phenyl groups; R' is a substituted or unsubstituted alkyl group of from 1 to 6 carbon atoms or hydrogen; R$^{iv}$ is selected from hydrogen, methyl, ethyl, propyl and phenyl groups; a+b has a value of 3 and neither a nor b has a value of zero; x=1–15; y=0–15; Z is a halogen or other negatively charged species.

Other useful silanes include those having the formula R$^{XV}_{4-e}$SiX$_e$ wherein R$^{XV}$ is independently selected from hydrogen, alkyl groups having 1 to 35 carbon atoms, phenyl, vinyl and allyl, methyl ether, ethyl ether, propyl ether, methyl ester, ethyl ester, propyl ester, methyl ketone, ethyl ketone, propyl ketone and Q wherein Q is selected from a group consisting of (a) alkyl groups having less than thirty-five carbon atoms, (b) aryl groups having less than thirty five carbon atoms (c) —(CH$_2$)$_x$(CF$_2$)$_y$CF$_3$, (d) —(CH$_2$)$_x$Cl, (e) —(CH$_2$)$_x$SR$^{iv}$, (f) —(CH$_2$)$_x$NR$_2^{iv}$, (g) —(CH$_2$)$_x$N(R$^{iv}$)(CH$_2$)$_x$N(R$^{iv}$)$_2$, (h) 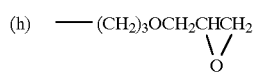

(i) 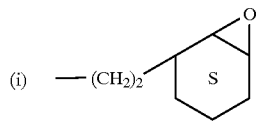

(j) —(CH$_2$)$_3$OC(O)C(CH$_3$)=CH$_2$ (k) 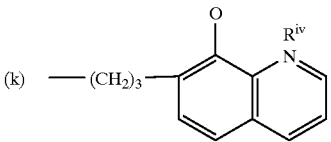

(l) 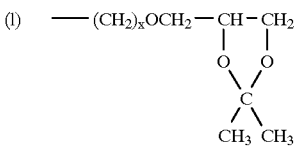

(m) —(CH$_2$)$_x$O(CH$_2$)$_x$OR
(n) —(CH$_2$)$_x$NR$_3^{iv}$Z and
(o) —(CH$_2$)$_x$NRC(O)OR$^{iv}$ wherein R" is independently selected from methyl, ethyl and phenyl groups; R" is selected from methyl, ethyl and phenyl groups; R' is a substituted or unsubstituted alkyl group of from 1 to 6 carbon atoms or hydrogen; R$^{iv}$ is selected from hydrogen, methyl, ethyl, propyl and phenyl groups; a+b has a value of 3 and neither a nor b has a value of zero; x=1–15; y=0–15; Z is a halogen or other negatively charged species;

X is a hydrolyzable radical selected from halogen, alkoxy having 1 to 4 carbon atoms, hydroxy, acetoxy, siloxy, amine, amide and amino radicals; and e has a value of 1, 2 or 3. Such silanes are known in the art and, for that reason, their process of manufacture will not be discussed herein.

Specific silanes useful with the present invention include, but are not limited to, the following:

triethoxysilylpropylethylcarbamate; cyanopropyldimethylchlorosilane; acetate blocked ethylene glycol propyldimethylchlorosilane; acetate blocked ethylene glycol propyltrichlorosilane; acetate blocked ethylene glycol propyldimethylmethoxysilane; ketal blocked diol dimethylsilyl n-methyacetamide; acetate blocked ethyleneglycol propyldimethylchlorosilane; octyldimethylchlorosilane; octyldiisopropylchlorosilane; octadecyldimethylmethoxysilane; perfluorobutylethylenedimethylchlorosilane; phenethyldimethylchlorosilane; 3-mercaptopropyltrimethoxysilane; trimethylchlorosilane; dimethyldichlorosilane; octadecyldimethylchlorosilane; hexamethyldisilazane; N,N'-bis(trimethylsilyl)urea; N-trimethylsilyldiethylamine; N-trimethylsilylimidazole; N,O-bis(trimethylsilyl)acetamide; N-methyl-N-trimethylsilyltrifluoroacetamide; t-butyldimethylsilylimidazole; t-butylmethylsilyldiimidazole; t-butylsilyltrimidazole; N-trimethylsilylacetamide; N-trimethylsilylpiperidine; hexamethyldisilithiane; O-trimethylsilylacetate; O-trimethylsilyltrifluoroacetate; N-trimethylsilyldimethylamine; N-trimethylsilylmorpholine; N-trimethylsilylpyrrolidine; N-trimethylsilylacetanilide; triacontyldimethylchlorosilane; chloropropyltrimethoxysilane; 2-(4-chlorosulfonylphenyl)ethyltrichlorosilane; and aminoprpyltriethyoxysilane.

The porous support materials found useful with this invention are those materials which are porous solids having hydroxyl groups on their surfaces. Such materials for example are silica, silica gel, alumina, stannia, titania, zirconia, and the like. Also, these materials can be porous glass, porous ceramic or plastic as long as the material has, or will form, hydroxyl groups on its surface.

The form of the porous material is not overly critical. Particulate porous materials, as well as filaments, slabs, discs, blocks, spheres, films and other such forms can be used in this invention. Also contemplated within the scope of this invention is the treatment of particulate materials by the process of this invention, and the subsequent forming of the treated particulate materials into slabs, discs, blocks, spheres, films, membranes, sheets and the like.

Preferred for this invention are the porous metalloid and metallic oxides such as silica, alumina, stannia and titania in all of their related forms. Most preferred are the silicas. Also contemplated within the scope of this invention are porous mixed metallic oxides such as $Na_2O.nH_2O$; $Al_2O_3.nH_2O$; and $SiO_2.nH_2O$, wherein n is the moles of water hydration, and the like.

Several factors are considered when choosing the interactive silanes to bond to the surface of the porous support material. The first factor to be considered is the relative polarity of the functionality of the silane. In this regard, the type of composition which is to be eluted plays a role in choosing the interactive silane. For example, if one wishes to elute hydrocarbons or aromatics, one may choose non-polar interactive silanes. As another example, if one wishes to elute amino acids, steroids, alcohols, esters, or halogenated compounds, one may choose polar interactive silanes. As still another example, if one wishes to elute, fatty acids, esters, ketones, ethers or sulfur containing compounds, one may choose a semi-polar interactive silane. The principles for choosing an appropriate interactive silane are known to one of skill in the art.

The second factor to be considered is the chain length of the interactive silane. The chain length of the interactive silane is chosen so that the reaction of the interactive silane with the solution to be analyzed influences the order of elution of the components of the solution to be analyzed. Two criteria are used to determine the chain lengths of the interactive silanes to be applied to the porous support material.

First, the chain length of the interactive silane should be at least four units long when combinations of short chain silanes (less than 8 unit in length) and long chain (8 or more units long) silanes are used. When only short chain silanes are used, the chain lengths of any two functionalities should differ by no more than four units. By providing interactive silanes of appropriate length, the domination of a longer chain silane over a shorter chain silane can be avoided and a synergistic effect between the interactive silanes can be achieved. For example, a $C_{18}$ silane will have a particular effect on the retention of the components of a mobile phase and a $C_8$ silane will have a different effect from the $C_{18}$ silane whereas a combination of the two will produce an effect on retention time which differs completely from the effect provided by the two silanes if they were to be used separately. Desirably, all silanes used with the present invention will have chain lengths of at least four units.

Second, the per cent carbon load in the chain of the interactive silane in conjunction with the degree of repeating $CH_2$ units in the chain are considered. This factor influences the overall retention of hydrophobic molecules by the bonded phase. Silanes having a higher carbon content increase the retentivity of the bonded phase. Also, silanes having a large number of repeating $CH_2$ units have a greater affinity for hydrophobic molecules and decrease the polarity of the bonded phase.

The third factor to be considered when choosing the interactive silane is the amount of the silane to be provided. The silane should be provided in an amount such that it significantly interacts with the solution to be analyzed and influences the elution order of the separation reaction. It has been experimentally determined that, assuming that the average support can accommodate about 2.5 molecules/nm$^2$, the minimum amount of interactive silane which must be added to the support should provide a coverage of at least about 0.1 molecules/nm$^2$ or about 4% of the total available hydroxyls.

Fourth, the interactive silane must be chosen so that it does not interact with any subsequently added silanes and so that it will form a permanent covalent bond with the hydroxyls on the surface of the porous support material. Further, the silane must be chosen so that it is not displaced by any subsequently added silanes. This does not, however, exclude the possibility of subsequent reaction or derivation of the bonded functional with organic reagents, such as, for example, reaction of tertiary amines with chloropropyl bonded silica or reaction of acrylic acid with primary and secondary amine bonded silica, or reaction of acrylates with sulfide bonded silica.

Fifth, the desired amount of surface silanols on the surface of the porous support material contacted with the interactive silanes must also be determined. This amount is determined experimentally by running several chromatographic analyses and observing the location, i.e., the elution order, of the peaks on the chromatogram. The amount of total coverage to be provided can then be determined by general chromatographic methods without undue experimentation.

Finally, if it is determined that a portion of the hydroxyls on the surface of the porous support are to remain unreacted with interactive silanes, a conventional end capping material may be added to porous support material to eliminate the effect that those unreacted hydroxyls may have on the separation process.

Once the appropriate silanes have been chosen, they are then added to the surface of the porous support material. The silanes can be added to the surface of the porous material simultaneously. However, it is preferred that they be added individually to ensure that the desired amount of each silane is added to the surface of the porous material. When added simultaneously, the rate of deposition of each individual silane plays a role in how much of the individual silanes are added to the surface of the porous material. This results in faster reacting silanes being added to the support in greater amounts than slower reacting silanes. To prevent this from occurring, the silanes are added one at a time.

The individual interactive silanes are added to the porous support material in a manner such that concentration domains of various functionalities are formed on the surface of the porous support material. By concentration domains of functionalities, it is meant that each silane occupies a localized region on the surface of the porous support material rather than being equally distributed across the entire surface, exterior and interior, of the porous support material. Controlled amounts of the silane are added so that a unique bonded phase having a unique polarity is created.

Several factors are considered when determining the order in which the interactive silanes are added to the surface of the porous support material. However, one should keep in mind that the following guidelines are exactly that and are to be followed as circumstances dictate.

One factor to be considered when determining the order in which the interactive silanes are added to the surface of the porous support material is the quantity of the interactive silane to be added to the support. Desirably, the interactive silanes are added to the porous material in increasing order from the smallest amount to the largest amount of the interactive silane to be added. In other words, the interactive silane which is to be added in the smallest volume is added first, followed by the interactive silane to be added in the second smallest volume, and so on, on up the interactive silane to be added in the largest volume.

Another factor, which is related to the first factor, is the length of the carbon chain of the interactive silane to be added to the surface of the porous support material. Desirably, the interactive silanes having shorter carbon chains are added prior to the interactive silanes having longer carbon chains. This is done because longer chain interactive silanes have a tendency to interfere with the bonding of shorter chain interactive silanes to the surface of the porous support material. These longer chain interactive silanes prevent the shorter chain interactive silanes from reaching unreacted hydroxyls on the surface of the porous support material. Thus, shorter carbon chain interactive silanes are desirably added prior to the longer chain interactive silanes so that the shorter chain interactive silanes can bond as close together as possible on the surface of the porous support material to form a concentration domain which contributes to the overall polarity of the porous support material.

A third factor to consider, when adding interactive silanes to the surface of the porous support material, is that an interactive silane bearing a hydrocarbon moiety is desirably added to the porous support material second. As one of skill in the art will understand, hydrocarbons are major contributors to the overall retention character of the porous support material and, subsequently, the chromatographic column. Thus, one wants to be sure that the hydrocarbon moieties are added to the porous support material. By applying them second in the order, many of the most reactive hydroxyls and next most reactive hydroxyls are available for bonding with the hydrocarbon moieties to ensure attachment of the hydrocarbon moieties to the porous support material.

Still another factor to consider is the nature of the interactions between the interactive silanes to be added to the porous support material. Desirably, the interactive silanes will be added to the porous support material in increasing order of their interactivity with each other. In other words, the interactive silane that is least reactive with the other interactive silanes will be added prior to the interactive silane which is the second least reactive silane with the other interactive silanes. The silane which is most reactive with the interactive silanes to be added to the surface of the porous support will desirably be added last. By adding the interactive silanes in this order, subsequently added interactive silanes will be less likely to bond with previously added interactive silanes and instead will bond with the hydroxyls on the surface of the porous support material. Further, the effect that previously added interactive silanes have on the bonding time of the subsequently added interactive silanes with the surface hydroxyls can be reduced.

The porous support materials of the present invention are formed by the following general procedure. A weighed sample, in units of grams of the porous support material is heated to reflux in a flask containing toluene sufficient to make a slurry concentration of at least about 50%. Typically, from about 2% to about 20% of the porous material on a weight to volume basis of the toluene is added to the toluene. A commercially available amine base, such as imidazole, pyridine, or their derivatives, is added to the slurry in an amount of from about 1% to about 25% on a weight to weight basis based on the weight of porous material. Then from about 0.5% to about 50% of a toluene solution of the first interactive silane is added to the slurry. The first interactive silane is then allowed to react and form covalent bonds with the hydroxyl groups on a portion of a surface of the porous material. To do this, the slurry is typically heated for from about 1 to about 21 hours before adding the additional interactive silane. After the first interactive silane has been allowed to bond with the surface of the porous material, from about 1% to about 50% of a toluene solution of at least one additional interactive silane having an organic functionality which differs from that of the first interactive silane is added to the toluene slurry containing the reacted first interactive silane. The slurry is then heated for from about 1 to about 21 hours to allow the additional interactive silane to react and form covalent bonds with a portion of the surface of the porous material not covered by the first silane by reacting with a portion of the hydroxyl groups not reacted with the first interactive silane to provide the porous material with a gradient of functionality of varied polarity. These gradients of functionality are distinct adjacent domains of interactive silanes which create a unique polarity for the bonded phase. This unique polarity is distinct from the polarity provided by the interactive silanes alone or when bonded in a non-adjacent fashion.

Subsequently added interactive silanes will have organic functionalities that differ from the functionality of the interactive silanes previously added to the surface of the porous material. In other words, additional interactive silanes added to the surface of the porous material do not have the same organic functionality of any previously added interactive silane. For example, the at least one additional interactive silane can comprise a second interactive silane having a second organic functionality and a third interactive silane having a third organic functionality. In this instance, the first organic functionality, the second organic functionality and the third organic functionality would be distinct from each other.

The number of interactive silanes which can be bonded to the surface of the porous support material is only limited by the surface area of the porous support material itself. As stated above, the porous support material typically can accommodate about 2.5 molecules/nm$^2$. However, nothing in this disclosure shall be construed as limiting the number of molecules of interactive silanes which can be added to the surface of the porous support material to be 2.5 molecules/nm$^2$.

One skilled in the art will appreciate that the same interactive silane can be used more than once in the reaction. This is typically done when organic functionalities of subsequent interactive silanes added to the surface of the porous material displace the organic functionality of a prior added silane so that the functionality of the prior added silane may need to be replenished.

To reduce the effect that any unreacted hydroxyls on the surface of the porous support material may have on the separation process, an end capping agent may also be added to the porous support material. An end capping agent is only necessary when unreacted hydroxyls exist on the surface of the support material and is not required.

When it is determined that the additional silane(s) are finished bonding with the porous material, the final slurry is then washed with acetone, toluene, and water, and filtered to remove non-bound by-products. Next, the filtered product is dried by heating it in an oven for from about 1 hour to about 10 hours at from about 50° to about 110° C. The final bonded phase material is packed into a 150 mm×4.6 mm i.d. stainless steel HPLC column by standard commercial slurry packing methods. The column is analyzed using an HPLC test mixture as described below.

The apparatus used to silylate the porous material includes standard organic laboratory glassware consisting of a 100–5000 mL three-necked rounded-bottom flask surmounted with a water cooled condenser, electric stir motor with glass stir rod and TEFLON® paddle, electric heating pad with temperature control and a dropped addition funnel. Filtration of the product slurry is by way of a glass-fitted filtration funnel. Standard precautions and procedures are used in handling the interactive silanes to avoid contact with excess water and the solvents.

HPLC TEST MIXTURE

A conventional test mixture comprising butylbenzene, o-terphenyl, triphenylene, and amylbenzene can be used to analyze the bonded phase materials of the present invention. The test mixture used to analyze the bonded phase materials of the present invention is prepared by first dissolving 0.0717 g of butylbenzene, 0.0593 g of o-terphenyl, 0.0562 of triphenylene, and 0.0702 g of amylbenzene, all available from Aldrich Chemical Company, Milwaukee, Wis., each in 20 mL of HPLC grade acetonitrile available from Fisher Scientific, Pittsburgh, Pa. These components are combined as a 4 to 1 to 1 to 2 parts solution based on volume and further diluted to 20% by volume with a mixture of 70% HPLC grade acetonitrile and 30% HPLC grade water available from Fisher Scientific, Pittsburgh, Pa.

The method and bonded phase materials of the present invention were analyzed using the test mixture described above by HPLC chromatography using a Hewlett Packard 1050 model chromatograph with a Diode Array detector and auto sampler, all of which are available from Hewlett Packard, San Fernando, Calif. The analysis solvent, commonly known as the mobile phase, is a mixture of 70% HPLC grade acetonitrile and 30% HPLC grade water and it is degassed using a Shoedex Degas automatic 3 channel degasser instrument. The analysis flow is 1 milliliter per minute using an injection volume of 0.3–1.0 microliter. The chromatographic data is printed out as standard chromatographic peaks in units of minutes.

To appreciate and understand the invention as described herein, the following examples are provided for illustration purposes only. These examples should not be construed as limiting the invention as defined in the claims.

EXAMPLE 1

A 10.44 g sample of porous 5 micron spherical silica, available from Daiso Company, Ltd, Osaka, Japan as Daisogel SP-60-5P, having a surface area of 437 $m^2/g$ and a pore diameter of 69 angstroms was heated to reflux in a flask containing 250 mL of toluene and 1.0 g of imidazole, both available from Aldrich Chemical Company, Milwaukee, Wis. To this slurry was added a 125 mL toluene solution of 2.14 g (0.2 molecules/$nm^2$) of acetate blocked ethylene glycol propyl trichlorosilane, available from Diazem Corporation, Midland, Mich., followed by addition of a 20 mL toluene solution of 2.14 g (1.10 molecules/$nm^2$) of octadecyldimethylchorosilane, available from United Chemicals Technology, Inc., Bristol, Pa., after 3 hours, followed by addition of a 20 mL toluene solution of 0.85 g (0.5 molecules/$nm^2$) of ketal blocked diol dimethylsilyl N-methylacetamide after 6 hours, followed by addition of a 10 mL toluene solution of 0.46 g (0.5 molecules/$nm^2$) of hexamethyldisilazane, available from Dow Corning Corporation, Midland, Mich., after 3 hours and stirring continued for an additional 8 hours.

The above material was washed with toluene, acetone, and water, dried by heating in an oven, and packed into a 150 mm×4.6 mm i.d. stainless steel HPLC column. The column was analyzed using the HPLC test mixture described above and gave an elution order of butyl benzene, o-terphenyl, amylbenze, and triphenylene.

Comparative Example 1

Conventional Bonded Phase

A 10.31 g sample of porous 5 micron spherical silica, available from Daiso Company, Ltd., Osaka, Japan as Daisogel SP-60-5P, having a surface area of 437 $m^2/g$ and a pore diameter of 69 angstroms was heated to reflux in a flask containing 250 mL of toluene and 1.0 g of imidazole, both available from Aldrich Chemical Company, Milwaukee, Wis., To this slurry was added a 20 mL toluene solution of 1.82 g (0.70 molecules/$nm^2$) of octadecyldimethylchorosilane, available from United Chemicals Technology, Inc., Bristol, Pa., followed by addition of a 20 mL toluene solution of 2.19 g (2.7 molecules/$nm^2$) of hexamethyldisilazane, available from Dow Corning Corporation, Midland, Mich., after 21 hours and stirring continued for an additional 8 hours.

The above material was washed with toluene, acetone, and water, dried by heating in an oven, and packed into a 150 mm×4.6 mm i.d. stainless steel HPLC column. The column was analyzed using the HPLC test mixture described above and gave an elution order of butylbenzene, o-terphenyl, triphenylene, and amylbenzene. This elution order differs from that of Example 1. Thus, a different combination of interactive silanes can provide the same porous support material with a different selectivity.

EXAMPLE 2

A 20.57 g sample of porous 5 micron spherical silica, available from Daiso Company, Ltd. Osaka, Japan as Daisogel SP-200-5P, having a surface area of 218 $m^2/g$ and a pore diameter of 211 angstroms was heated to reflux in a flask containing 400 mL of toluene and 2.0 g of imidazole, both of which are available from Aldrich Chemical Company, Milwaukee, Wis. To this slurry was added a 125 mL toluene solution of 1.02 g (0.2 molecules/$nm^2$) of 3,3,4,4,5,5,6,6,6-nonafluorobutyldimethylchlorosilane, available from Diazem Corporation, Midland, Mich., followed by addition of a 20 mL toluene solution of 1.55 g (1.10 molecules/$nm^2$) of octyldimethylchorosilane, available from United Chemicals Technology, Inc., Bristol, Pa., after 3 hours, followed by addition of a 10 mL toluene solution of 0.81 g (1.0 molecules/$nm^2$) of trimethylchlorosilane, available from Dow Corning Corporation, Midland, Mich., after 6 hours and stirring continued for an additional 12 hours.

The above material was washed with toluene, acetone, and water, dried by heating in an oven, and packed into a 150 mm×4.6 mm stainless steel HPLC column. The column was analyzed using the HPLC test mixture described above and gave an elution order of triphenylene, butylbenzene, o-terphenyl, and amylbenzene.

Comparative Example 2

Conventional Bonded Phase

A 30.00 g sample of porous 5 micron spherical silica, available from Daiso Company, Ltd., Osaka, Japan as Daisogel SP-200-5P, having a surface area of 218 $m^2/g$ and a pore diameter of 211 angstroms was heated to reflux in a flask containing 600 mL of toluene and 3.0 g of imidazole, both available from Aldrich Chemical Company, Milwaukee, Wis. To this slurry was added a 125 mL toluene solution of 5.62 g (2.50 molecules/nm$^2$) of octyldimethylchorosilane, available from United Chemicals Technology, Inc., Bristol, Pa. followed by addition of a 10 mL toluene solution of 3.17 g (1.80 molecules/nm$^2$) of trimethylchlorosilane, available from Dow Corning Corporation, Midland, Mich., as an end capping agent after 14 hours and stirring continued for an additional 8 hours.

The above material was washed with toluene, acetone, and water, dried by heating in an oven, and packed into a 150 mm×4.6 mm stainless steel HPLC column. The column was analyzed using the HPLC test mixture described above and gave an elution order of butylbenzene, triphenylene, o-terphenyl, and amylbenzene. As can be seen, this elution order differs from that obtained by the bonded phase material of Example 2.

EXAMPLE 3

A 120 g sample of porous 5 micron spherical silica, available from YMC, Inc., Wilmington, N.C. as YMC SIL 60A S-5, having a surface area of 470 m$^2$/g and a pore diameter of 60 angstroms was heated to reflux in a flask containing 1500 mL of toluene and 15.0 g of imidazole, both available from Aldrich Chemical Company, Milwaukee, Wis. To this slurry was added a 250 mL toluene solution of 9.56 g (0.3 molecules/nm$^2$) of 3,3,4,4,5,5,6,6,6-nonafluorobutyldimethylchlorosilane, available from Diazem Corporation, Midland, Mich., followed by addition of a 150 mL toluene solution of 37.78 g (2.0 molecules/nm$^2$) of phenethyldimethylchlorosilane, available from United Chemicals Technology, Inc., Bristol, Pa., after 3 hours, followed by addition of a 30 mL toluene solution of 8.46 g (0.5 molecules/nm$^2$) of trimethylchlorosilane, available from Dow Corning Corporation, Midland, Mich., after 6 hours, followed by the addition of 7.65 g (0.5 molecules/nm$^2$) of hexamethyldisilazane, available from Dow Corning Corporation, Midland, Mich., after 3 hours and stirring continued for an additional 8 hours.

The above material was washed with toluene, acetone, and water, dried by heating in an oven, and packed into a 150 mm×4.6 mm stainless steel HPLC column. The column was analyzed using the HPLC text mixture and gave an elution order of butylbenzene, triphenylene, o-terphenyl, and amylbenzene.

EXAMPLE 4

A 20.00 g sample of porous 5 micron spherical silica, available from YMC, Inc., Wilmington, N.C. as YMC SIL 60A S-5, having a surface area of 410 m$^2$/g and a pore diameter of 60 angstroms was heated to reflux in a flask containing 500 mL of toluene and 2.0 g of imidazole, both available from Aldrich Chemical Company, Milwaukee, Wis. To this slurry was added a 125 mL toluene solution of 3.70 g (0.8 molecules/nm$^2$) of 3,3,4,4,5,5,6,6,6-nonafluorobutyldimethylchlorosilane, available from Diazem Corporation, Midland, Mich., followed by addition of a 20 mL toluene solution of 1.82 g (0.70 molecules/nm$^2$) of octadecyldimethylmethoxysilane, available from United Chemicals Technology, Inc., Bristol, Pa. after 4 hours, followed by addition of a 20 mL toluene solution of 1.0 g (0.24 molecules/nm$^2$) of ketal blocked diol dimethylsilyl N-methylacetamide, available from Diazem Corporation, Midland, Mich., after 3 hours, followed by addition of a 20 mL toluene solution of 2.00 g (0.9 molecules/nm$^2$) of hexamethyldisilazane, available from Dow Corning Corporation, Midland, Mich., after 2 hours and stirring continued for an additional 8 hours.

The above material was washed with toluene, acetone, and water, dried by heating in an oven, and packed into a 150 mm×4.6 mm stainless steel HPLC column. The column was analyzed using the HPLC test mixture described above and gave an elution order of o-terphenyl, triphenylene, butylbenzene, and amylbenzene. This was compared to a commercial octadecyldimethylsilane bonded column available from YMC, Inc., Wilmington, N.C. and sold commercially as YMC ODS-A, which gave an elution order of butylbenzene, o-terphenyl, triphenylene, and amylbenzene.

EXAMPLE 5

A 185.00 g sample of porous 5 micron spherical silica, available from YMC, Inc., Wilmington, N.C. was YMC SIL 60A S-5, having a surface area of 410 m$^2$/g and a pore diameter of 60 angstroms was heated to reflux in a flask containing 2500 mL of toluene and 18.50 g of imidazole, both available from Aldrich Chemical Company, Milwaukee, Wis. To this slurry was added a 1000 mL toluene solution of 26.7 g (0.7 molecules/nm$^2$) of ketal blocked diol dimethylsilyl N-methylacetamide, available from Diazem Corporation, Midland, Mich., followed by addition of a 100 mL toluene solution of 34.9 g (0.80 molecules/nm$^2$) of octadecyldimethylchorosilane, available from United Chemicals Technology, Inc., Bristol, Pa., after 4 hours, followed by addition of a 100 mL toluene solution of 11.51 g (0.7 molecules/nm$^2$) of hexamethyldisilazane, available from Dow Corning Corporation, Midland, Mich., after 8 hours and stirring continued for an additional 12 hours.

The above material was washed with toluene, acetone, and water, dried by heating in an oven, and packed into a 150 mm×4.6 mm stainless steel HPLC column. The column was analyzed using the HPLC test mixture described above and gave an elution order of butylbenzene, o-terphenyl, amylbenzene, and triphenylene. This was compared to a commercial octdecyldimethylsilane bonded column available from YMC, Inc., Wilmington, N.C. sold commercially as YMC ODS-A which gave an elution order of butylbenzene, o-terphenyl, triphenylene, and amylbenzene.

In the following examples, the following numbers 5,6,7 and 8 are used to represent the components in the HPLC test mixture, which was described above. In these examples, the numbers correspond to the following components of the test mixture:

5—butylbenzene;

6—o-terphenyl;

7—triphenylene; and

8—amylbenzene.

These numbers represent the order in which these components are eluted by conventional octadecyldimethylsilane columns. Conventional octadimethylsilane columns will also provide an elution order of 5,7,6 and 8. As can be seen in the following examples, the method of the present invention provides greater selectivity by providing additional elution orders to those provided by conventional columns.

In the following examples and tables, interactive silanes were added to the porous support material by the method described above. To keep the size of the tables manageable, the following abbreviations were used to represent the interactive silanes:

| | |
|---|---|
| CBMC | Triethoxysilylpropylethylcarbamate, available from Gelest, Inc. of Tullytown, PA; |
| CNCl | Cyanopropyldimethylchlorosilane, available from United Chemicals Technology, Inc. of Bristol, PA; |
| MEOCl | Acetate blocked ethylene glycol propyl dimethylchlorosilane available from Diazem Corporation of Midland, MI; |
| EOCl3 | Acetate blocked ethylene glycol propyl trichlorosilane available from Diazem; |
| HMDZ | Hexamethyldisilazane, available from Dow Corning Corp. of Midland, MI; |
| KBDA | Ketal Blocked Diol dimethylsilyl n-methylacetamide available from Diazem; |
| OctCl | Octyldimethylchlorosilane, available from United Chemicals Technology; |
| OctDIPCl | Octyldiisopropylchlorosilane, available from Gelest Inc.; |
| ODSCl | Octadecyldimethylchlorosilane, available from United Chemicals Technology; |
| ODSM | Octadecyldimethylmethoxysilane, available from United Chemicals Technology; |
| PFBCl | Perfluorobutylethylenedimethylchlorosilane, available from Diazem; |
| PhCl | Phenethyldimethylchlorosilane, available from United Chemicals Technology; |
| RSHCl | 3-mercaptopropyltrimethyoxysilane, available from Gelest, Inc.; and |
| TMCS | Trimethylchlorosilane, available from United Chemicals Technology. |

EXAMPLE 7

To determine whether the porous support material played a role in changing the elution order, the same interactive silanes were coated onto different silica support materials, available from different manufacturers, by the method of this invention which is described above. The following table shows that the silica support plays no role in determining the elution order and that the elution order is determined by the interactive silanes added to the porous support material.

TABLE 1

Same Interactive Silanes Used on Different Supports

| Run | Support Manuf. | Silane 1 | Silane 2 | Silane 3 | Silane 4 | Silane 5 | Elut. Order |
|---|---|---|---|---|---|---|---|
| 29 | YMC 2 | PFBCl | ODSCl | PFBCl | TMCS | HMDZ | 7658 |
| 30 | Daiso 4 | PFBCl | ODSCl | PFBCl | TMCS | HMDZ | 7658 |
| 31 | Hypersil | PFBCl | ODSCl | PFBCl | TMCS | HMDZ | 7658 |
| 32 | Daiso 3 | PFBCl | ODSCl | PFBCl | TMCS | HMDZ | 7658 |

YMC 2—YMC-GEL SIL-120-S5 having a surface area of approximately 305 m$^2$/g, available from YMC, Inc. of Wilmington, N.C.

Daiso 4—Daisogel SP-120-5P having a surface area of approximately 323 m$^2$/g, available from Daiso Company Ltd. of Osaka, Japan Hypersil—HS Silica 5$\mu$ having a surface area of approximately 300 m$^2$/g, available from Hypersil of Holliston, Mass.

Daiso 3—Daisogel SP-200-5P having a surface area of approximately 218 m$^2$/g, available from Daiso Company Ltd. of Osaka, Japan

EXAMPLE 8

To confirm that the interactive silanes added to the support affected the order of elution, five different combinations of interactive silanes were added to the same porous support material by the method of this invention which is described above. This example demonstrates that it is the interactive silanes added to the support which determine the elution order. The chemicals in the following table were added to a Daisogel SP-120-5P support material having a surface area of approximately 323 m$^2$/g, available from the Daiso Company Ltd. of Osaka, Japan.

TABLE 2

Different Interactive Silanes on Same Support

| Run | Silane 1 | Silane 2 | Silane 3 | Silane 4 | Silane 5 | Elut. Order |
|---|---|---|---|---|---|---|
| 36 | PFBCl | OctCl | PFBCl | TMCS | HMDZ | 7658 |
| 37 | PFBCl | OctDIPCl | PFBCl | TMCS | HMDZ | 7658 |
| 39 | PFBCl | OctCl | CBMCl | TMCS | HMDZ | 7568 |
| 40 | PFBCl | OctCl | RSHCl | TMCS | HMDZ | 7568 |
| 41 | MEOCl | OctCl | MEOCl | TMCS | HMDZ | 5867 |

As can be seen from this example, different chemicals added to the same porous support material can produce different elution orders.

EXAMPLE 9

As another example of the use of different interactive silanes on the same support, different mixtures of interactive silanes were added by the method of this invention, which is described above, to a YMC-GEL SP-60-5S support material having a surface area of approximately 470 m$^2$/g, available from YMC, Inc. of Wilmington, N.C.

TABLE 3

Different Interactive Silanes on Same Support

| Run | Silane 1 | Silane 2 | Silane 3 | Silane 4 | Silane 5 | Elut. Order |
|---|---|---|---|---|---|---|
| 13 | PFBCl | ODSCl | KBDA | HMDZ | — | 5678 |
| 23 | PFBCl | ODSM | KBDA | HMDZ | — | 6758 |
| 33 | KBDA | ODSCl | HMDZ | — | — | 5687 |

EXAMPLE 10

As still another example of the use of different interactive silanes on the same porous support material, different mixtures of interactive silanes were added by the method of this invention, which is described above, to a YMC-GEL SP-60-5S support material having a surface area of approximately 470 m$^2$/g, available from YMC, Inc. of Wilmington, N.C.

TABLE 4

Different Interactive Silanes on Same Support

| Run | Silane 1 | Silane 2 | Silane 3 | Silane 4 | Silane 5 | Elut. Order |
|---|---|---|---|---|---|---|
| 45 | EOCl3 | CNCl | EOCL3 | — | — | 5867 |
| 47 | PFBCl | PhCl | TMCS | HMDZ | — | 5786 |

Again, it can be seen that the addition of silanes bearing different organic functionalities provided on the same porous support material can be used to select different elution orders.

While certain representative embodiments and details have been shown for purposes of illustrating the invention, it will be apparent to those skilled in the art that various changes in the formulations and methods disclosed herein may be made without departing from the scope of the invention, which is defined in the appended claims.

What is claimed is:

1. A bonded phase material comprising:

a hydroxyl bearing porous material, the hydroxyl bearing porous material having a surface;

a first controlled stoichiometric amount of a first interactive silane having a first organic functionality covalently bonded to the surface of the hydroxyl bearing porous material; and at least one additional controlled stoichiometric amount of at least one additional interactive silane having an other organic functionality, the other organic functionality being distinct from the first organic functionality, and the at least one additional interactive silane being covalently bonded to the surface of the hydroxyl bearing porous material;

wherein the first interactive silane and the at least one additional interactive silane are each present in an amount large enough to provide a coverage of at least about 0.10 molecules per square nanometer of the porous material and thereby provide the porous material with a gradient of functionality of varied polarity which creates a unique overall polarity which is not obtainable by the separate interactive silanes themselves.

2. The bonded phase material of claim 1 wherein the number of additional interactive silanes which can be covalently bonded to the surface of the hydroxyl bearing porous material is limited only by the surface area of the hydroxyl bearing porous material.

3. The bonded phase material of claim 1 wherein at least one of the first interactive silane and the at least one additional interactive silane are selected from the group consisting of:

(i) disubstituted amides wherein the amides are selected from the group consisting of
   (a) N,N-disubstituted amides having the general formula (R)(R")$_a$Si{N(R''')CR'}$_b$ with C=O and
   (b) N,O-disubstituted amides having the general formula (R)(R")$_a$SiN=C—R' with [OSi(R)(R")$_2$]$_b$ wherein in the formulae, R is selected from hydrogen, allyl, vinyl and Q wherein Q is selected from a group consisting of
   (a) alkyl groups having less than thirty-five carbon atoms,
   (b) aryl groups having less than thirty five carbon atoms
   (c) —(CH$_2$)$_x$(CF$_2$)$_y$CF$_3$,
   (d) —(CH$_2$)$_x$Cl,
   (e) —(CH$_2$)$_x$SR$^{iv}$,
   (f) —(CH$_2$)$_x$NR$_2^{iv}$,
   (g) —(CH$_2$)$_x$N(R$^{iv}$)(CH$_2$)$_x$N(R$^{iv}$)$_2$, (h) —(CH$_2$)$_3$OCH$_2$CHCH$_2$ with epoxide O (i) —(CH$_2$)$_2$— 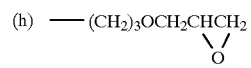

(j) —(CH$_2$)$_3$OC(O)C(CH$_3$)=CH$_2$ (k) —(CH$_2$)$_3$— 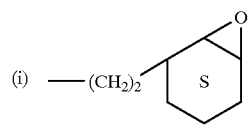

(l) —(CH$_2$)$_x$OCH$_2$—CH—CH$_2$ with O O bridged by C(CH$_3$)$_2$ (m) —(CH$_2$)$_x$O(CH$_2$)$_x$OR
   (n) —(CH$_2$)$_x$NR$_3^{iv}$Z and
   (o) —(Ch$_2$)$_x$NRC(O)OR$^{iv}$ wherein R" is independently selected from methyl, ethyl and phenyl groups; R''' is selected from methyl, ethyl and phenyl groups; R' is a substituted or unsubstituted alkyl group of from 1 to 6 carbon atoms or hydrogen; R$^{iv}$ is selected from hydrogen, methyl, ethyl, propyl and phenyl groups; a+b has a value of 3 and neither a nor b has a value of zero; x=1–15; y=0–15; Z is a halogen or other negatively charged species;

(ii) substituted amines wherein the amines are selected from a group consisting of
   (a) N,N,N-trisubstituted amines having the general formula (R$^v$) (R$^{vi}$)$_c$Si(NR$^{vii}$$_2$)$_d$ and
   (b) heterocyclic amines, wherein the heterocyclic amines are selected from the group consisting of

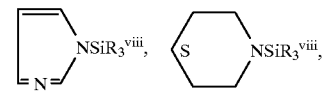

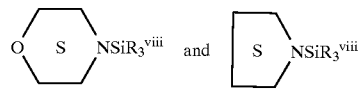

wherein in the formulae R$^v$ and R$^{viii}$ are each independently selected from a group consisting of hydrogen, allyl, vinyl and Q' wherein Q' is selected from a group consisting of
   (a) alkyl groups having less than thirty-five carbon atoms,
   (b) aryl groups having less than thirty five carbon atoms
   (c) —(CH$_2$)$_x$(CF$_2$)$_y$CF$_3$,
   (d) —(CH$_2$)$_x$Cl,
   (e) —(CH$_2$)$_x$SR$^{iv}$, (f) —(CH$_2$)$_x$NR$_2^{iv}$,
(g) —(CH$_2$)$_x$N(R$^{iv}$)(CH$_2$)$_x$N(R$^{iv}$)$_2$, (h) 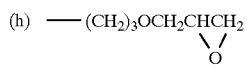

(i) 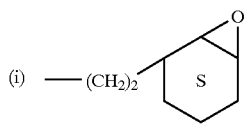

(j) —(CH$_2$)$_3$OC(O)C(CH$_3$)=CH$_2$ (k) 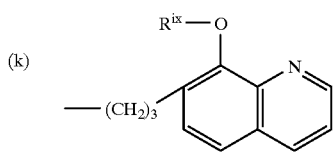

(l) 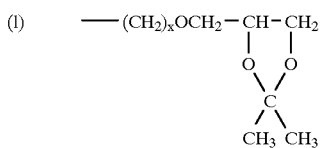

(m) —(CH$_2$)$_x$O(CH$_2$)$_x$OR
(n) —(CH$_2$)$_x$NR$_3^{iv}$Z
(o) —(CH$_2$)$_x$NRC(O)OR$^{iv}$ wherein R" is independently selected from methyl, ethyl and phenyl groups; R" is selected from methyl, ethyl and phenyl groups; R' is a substituted or unsubstituted alkyl group of from 1 to 6 carbon atoms or hydrogen; R$^{iv}$ is selected from hydrogen, methyl, ethyl, propyl and phenyl groups; a+b has a value of 3 and neither a nor b has a value of zero; x=1–15; y=0–15; Z is a halogen or other negatively charged species;

(iii) thioethers selected from the group consisting of (a) thioethers having the general formula R$^x$R$_2^{xi}$Si(SR$^{xii}$)$_d$S and (b) thioethers having the general formula (R$^x$R$_2^{xi}$Si)$_2$S wherein in the formulae, R$^x$ is selected from a group consisting of hydrogen, allyl, vinyl and Q" wherein Q" is selected from a group consisting of (a) alkyl groups having less than thirty-five carbon atoms,
(b) aryl groups having less than thirty five carbon atoms
(c) —(CH$_2$)$_x$(CF$_2$)$_y$CF$_3$,
(d) —(CH$_2$)$_x$Cl,
(e) —(CH$_2$)$_x$SR$^{iv}$,
(f) —(CH$_2$)$_x$NR$_2^{iv}$,
(g) —(CH$_2$)$_x$N(R$^{iv}$)(CH$_2$)$_x$N(R$^{iv}$)$_2$, (h) 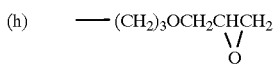

(i) 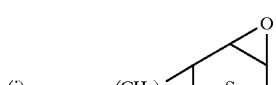

(j) —(CH$_2$)$_3$OC(O)C(CH$_3$)=CH$_2$ (k) 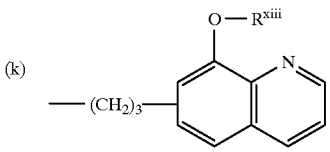

(l) 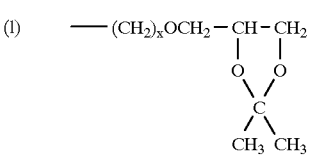

(m) —(CH$_2$)$_x$O(CH$_2$)$_x$OR
(n) —(CH$_2$)$_x$NR$_3^{iv}$Z and
(o) —(CH$_2$)$_x$NRC(O)OR$^{iv}$ wherein R" is independently selected from methyl, ethyl and phenyl groups; R" is selected from methyl, ethyl and phenyl groups; R' is a substituted or unsubstituted alkyl group of from 1 to 6 carbon atoms or hydrogen; R$^{iv}$ is selected from hydrogen, methyl, ethyl, propyl and phenyl groups; a+b has a value of 3 and neither a nor b has a value of zero; x=1–15; y=0–15; Z is a halogen or other negatively charged species.

4. The bonded phase material of claim 1 wherein at least one of the first interactive silane and the at least one additional interactive silane has the formula R$^{xv}_{4-e}$SiX$_e$ wherein R$^{xv}$ is independently selected from hydrogen, alkyl groups having 1 to 35 carbon atoms, phenyl, vinyl and allyl, methyl ether, ethyl ether, propyl ether, methyl ester, ethyl ester, propyl ester, methyl ketone, ethyl ketone, propyl ketone and Q wherein Q is selected from a group consisting of (a) alkyl groups having less than thirty-five carbon atoms,
(b) aryl groups having less than thirty five carbon atoms
(c) —(CH$_2$)$_x$(CF$_2$)$_y$CF$_3$,
(d) —(CH$_2$)$_x$Cl,
(e) —(CH$_2$)$_x$SR$^{iv}$,
(f) —(CH$_2$)$_x$NR$_2^{iv}$,
(g) —(CH)$_x$N(R$^{iv}$)(CH$_2$)$_x$N(R$^{iv}$)$_2$, (h) 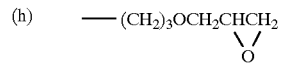

(i) 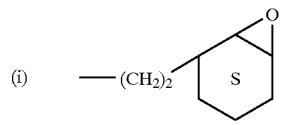

(j) —(CH$_2$)$_3$OC(O)C(CH$_3$)=CH$_2$ (k) 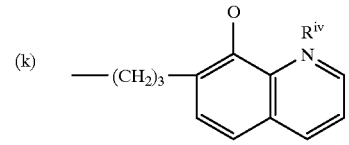

-continued (i) 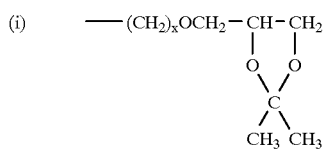

(m) —(CH$_2$)$_x$O(CH$_2$)$_x$OR
(n) —(CH$_2$)$_x$NR$_3^{iv}$Z and
(o) —(CH$_2$)$_x$NRC(O)OR$^{iv}$ wherein R" is independently selected from methyl, ethyl and phenyl groups; R" is selected from methyl, ethyl and phenyl groups; R' is a substituted or unsubstituted alkyl group of from 1 to 6 carbon atoms or hydrogen; R$^{iv}$ is selected from hydrogen, methyl, ethyl, propyl and phenyl groups; a+b has a value of 3 and neither a nor b has a value of zero; x=1–15; y=0–15; Z is a halogen or other negatively charged species;

X is a hydrolyzable radical selected from halogen, alkoxy having 1 to 4 carbon atoms, hydroxy, acetoxy, siloxy, amine, amide and amino radicals; and e has a value of 1, 2 or 3.

5. The bonded phase material of claim 1 wherein the first interactive silane and the at least one additional interactive silane are selected from the group consisting of triethoxysilylpropylethylcarbamate; cyanopropyldimethylchlorosilane; acetate blocked ethylene glycol propyldimethylchlorosilane; acetate blocked ethylene glycol propyltrichlorosilane; acetate blocked ethylene glycol propyldimethylmethoxysilane; ketal blocked diol dimethylsilyl n-methyacetamide; acetate blocked ethyleneglycol propyldimethylchlorosilane; octyldimethylchlorosilane; octyldiisopropylchlorosilane; octadecyldimethylmethoxysilane; perfluorobutylethylenedimethylchlorosilane; phenethyldimethylchlorosilane; 3-mercaptopropyltrimethoxysilane; trimethylchlorosilane; dimethyldichlorosilane; octadecyldimethylchlorosilane; hexamethyldisilazane; N,N'-bis(trimethylsilyl)urea; N-trimethylsilyldiethylamine; N-trimethylsilylimidazole; N,O-bis(trimethylsilyl)acetamide; N-methyl-N-trimethylsilyltrifluoroacetamide; t-butyldimethylsilylimidazole; t-butylmethylsilyldiimidazole; t-butylsilyltrimidazole; N-trimethylsilylacetamide; N-trimethylsilylpiperidine; hexamethyldisilithiane; O-trimethylsilylacetate; O-trimethylsilyltrifluoroacetate; N-trimethylsilyldimethylamine; N-trimethylsilylmorpholine; N-trimethylsilylpyrrolidine; N-trimethylsilylacetanilide; triacontyldimethylchlorosilane; chloropropyltrimethoxysilane; 2-(4-chlorosulfonylphenyl)ethyltrichlorosilane; and aminoprpyltriethyoxysilane.

6. The bonded phase material of claim 1 further including an end capping agent which is provided to bond with any unreacted hydroxyls on the surface of the porous material.

7. A bonded phase material comprising:
a hydroxyl bearing porous material, the hydroxyl bearing porous material having a surface;
a first controlled stoichiometric amount of a first interactive silane having a first organic functionality covalently bonded to a portion of the surface of the hydroxyl bearing porous material; and
at least one additional controlled stoichiometric amount of at least one additional interactive silane being covalently bonded to a portion of the surface of the hydroxyl bearing material, including a second interactive silane having a second organic functionality and a third interactive silane having a third organic functionality, the first organic functionality, the second organic functionality, and the third organic functionality being distinct from each other;
wherein the first interactive silane and the at least one additional interactive silane provide the porous material with a gradient of functionality of varied polarity.

8. The bonded phase material of claim 7 wherein said at least one additional interactive silane further includes a fourth interactive silane having a fourth organic functionality, the third organic functionality and the fourth organic functionality being distinct from each other.

9. The bonded phase material of claim 8 wherein said at least one additional interactive silane further includes a fifth interactive silane having a fifth organic functionality, the first organic functionality, the second organic functionality, the third organic functionality, the fourth organic functionality and the fifth organic functionality being distinct from each other.

10. The bonded phase material of claim 9 wherein the first interactive silane is perfluorobutylethylenedimethylchlorosilane; the second interactive silane is octyldimethylchlorosilane; the third interactive silane is triethoxysilylporpylethylcarbamate; the fourth interactive silane is trimethylchlorosilane; and the fifth interactive silane is hexamethyldisilazane.

11. The bonded phase material of claim 8 wherein the first interactive silane is perfluorobutylethylenedimethylchlorosilane; the second interactive silane is octyldimethylchlorosilane; the third interactive silane is trimethylchlorosilane; and the fourth interactive silane is hexamethyldisilazane.

12. The bonded phase material of claim 8 wherein the first interactive silane is an acetate blocked ethylene glycol propyldimethylchlorosilane; the second interactive silane is octyldimethylchlorosilane; the third interactive silane is trimethylchlorosilane; and the fourth interactive silane is hexamethyldisilazane.

* * * * *